United States Patent [19]

Prince

[11] Patent Number: 4,648,497

[45] Date of Patent: Mar. 10, 1987

[54] SINGLE LEVER CONTROL

[75] Inventor: Anthony F. Prince, Waukegan, Ill.

[73] Assignee: Outboard Marine Corporation, Waukegan, Ill.

[21] Appl. No.: 715,202

[22] Filed: Mar. 22, 1985

[51] Int. Cl.[4] .................... B60K 41/02

[52] U.S. Cl. .................... 192/0.084; 192/0.096

[58] Field of Search .................... 192/0.096, 0.048, 0.07, 192/0.075, 0.084; 74/471 XY, 471 R

[56] References Cited

U.S. PATENT DOCUMENTS

| | | | |
|---|---|---|---|
| 3,057,221 | 10/1962 | Smith | 74/472 |
| 3,130,598 | 4/1964 | Burnham | 74/472 |
| 4,090,598 | 5/1978 | Prince . | |
| 4,195,534 | 4/1980 | Prince . | |

FOREIGN PATENT DOCUMENTS

| | | |
|---|---|---|
| 19052 | 6/1975 | Japan . |
| 26159 | 8/1975 | Japan . |

OTHER PUBLICATIONS

OMC drawing Nos. 174143 and 174056.

*Primary Examiner*—George H. Krizmanich
*Attorney, Agent, or Firm*—Michael, Best & Friedrich

[57] ABSTRACT

A single lever control for use with an engine including a clutch and a throttle, the control comprising a housing, a control member rotatably mounted on the housing for movement between a neutral position and a full throttle position through a clutch engaging interval and then a clutch engaged throttle advancing interval, a clutch drive mechanism adapted to be connected to the engine clutch and selectively operably connected to the control member for providing engagement of the engine clutch in response to rotation of the control member through the clutch engaging interval, and a throttle drive mechanism adapted to be connected to the engine throttle and selectively operably connected to the control member for providing substantial advancement of the engine throttle in response to rotation of the control member through the clutch engaging interval.

21 Claims, 11 Drawing Figures

SINGLE LEVER CONTROL

BACKGROUND OF THE INVENTION

This invention relates generally to single lever controls for regulating the throttle associated with an internal combustion engine. More specifically, this invention relates to single lever controls for regulating the throttle and the clutch associated with an internal combustion engine and, even more particularly, to single lever controls for marine propulsion devices such as outboard motors and stern drive units.

Attention is directed to U.S. Prince Pat. No. 4,090,598, issued May 23, 1978, and Prince U.S. Pat. 4,195,534, issued Apr. 1, 1980.

SUMMARY OF THE INVENTION

This invention provides a single lever control for use with an engine including a clutch and a throttle. The control comprises a housing, a control member rotatably mounted on the housing for movement between a neutral position and a full throttle position through a clutch engaging interval and then a clutch engaged throttle advancing interval, clutch drive means adapted to be connected to the engine clutch and selectively operably connected to the control member for providing engagement of the engine clutch in response to rotation of the control member through the clutch engaging interval, and throttle drive means adapted to be connected to the engine throttle and selectively operably connected to the control member for providing substantial advancement of the engine throttle in response to rotation of the control member through the clutch engaging interval.

This invention also provides a single lever control for use with an engine including a throttle, the control comprising a housing, a control member rotatably mounted on the housing, a throttle drive member movably supported by the housing and adapted to be operably connected to the engine throttle, first throttle drive means selectively operably connecting the control member and the throttle drive member for providing substantial advancement of the engine throttle in response to rotation of the control member, and second throttle drive means selectively operably connecting the control member and the throttle drive member for providing substantial advancement of the engine throttle in response to rotation of the control member.

This invention also provides a single lever control for use with an engine including a throttle, the control comprising a housing, a throttle drive member supported within the housing and including a cylindrical throttle cam, and a control member supported within the housing for rotation relative to the housing from a neutral position to a full throttle position through a first interval and then a second interval, and rotatably received in and concentric with the throttle cam.

In one embodiment, the control further includes throttle driving means operable between the control member and the throttle cam for rotating the throttle cam when the control member rotates through the second interval, and throttle dwell means operable between the throttle cam and the control member for permitting rotation of the control member relative to the throttle cam when the control member rotates through the first interval.

In one embodiment, the control further includes throttle locking means operable between the throttle cam and a cylindrical portion fixed relative to the housing for locking the throttle cam against movement relative to the housing when the control member rotates through the first interval.

This invention also provides a single lever control for use with an engine including a throttle. The control comprises a housing, a throttle lever supported by the housing for movement and adapted to actuate the engine throttle in response to movement of the throttle level, a throttle drive member movably supported by the housing, a cam member, means on the housing and supporting the cam member for movement relative to the housing along a predetermined rectilinear path, means operable between the throttle drive member and the cam member for displacing the cam member along its path in response to movement of the throttle drive member, and means operable between the cam member and the throttle level to move the throttle lever in response to movement of the cam member along its predetermined path.

This invention also provides a single lever control for use with an engine including a throttle. The control comprises a housing, a throttle lever supported on the housing for movement and including an end adapted to actuate the engine throttle in response to movement of the throttle lever, a throttle drive member movably supported on the housing, a drive pin connected to the throttle drive member, and means operable between the throttle lever and the throttle drive member for moving the throttle lever in response to movement of the throttle drive member. The throttle lever moving means comprises a cam member with a cam track receiving the drive pin and having a shape effective to displace the cam member relative to the housing in response to rotation of the throttle drive member, and a displacement track adjacent the throttle lever, guide track means in the cam member and extending in the direction of displacement of the throttle lever end and generally perpendicular to the displacement track for guiding displacement of the cam member relative to the housing along a rectilinear path in response to movement of the drive pin in the cam track, a guide pin rotatably connecting the throttle lever to the housing and received in the guide track means, and a throttle projection on the throttle lever, received in the displacement track, and spaced from the guide pin so that movement of the cam member relative to the guide pin moves the throttle projection thereby moving the throttle lever.

One of the principal features of the invention is the provision of a single lever control including a clutch drive mechanism selectively operable for providing engagement of an engine clutch in response to rotation of a control member through a clutch engaging interval, and a throttle warm up mechanism selectively operable for providing substantial advancement of the engine throttle to obtain engine warm up in response to rotation of the control member through the same clutch engaging interval. With this single lever control, it is not necessary to advance the control member through a clutch engaging interval to a clutch engaged throttle interval in order to obtain engine warm up.

Another of the principal features of the invention is the provision of an improved throttle drive mechanism for providing substantial advancement of the engine throttle in response to rotation of a control member.

Another of the principal features of the invention is the provision of a single lever control which includes first and second throttle drive mechanisms for providing substantial advancement of an engine throttle in response to rotation of a control member.

A further principal feature of the invention is the provision of a single lever control which includes an improved mechanism for preventing clutch disengagement while a control member rotates and advances the engine throttle when the clutch is engaged.

Another of the principal features of the invention is the provision of a single lever control as described in the preceding paragraphs, which control does not require lateral or axial displacement of control linkage connecting the control to either the engine clutch or the engine throttle.

Other features and advantages of the embodiments of the invention will become apparent upon reviewing the following description, the drawings, and the appended claims.

Figure 2:
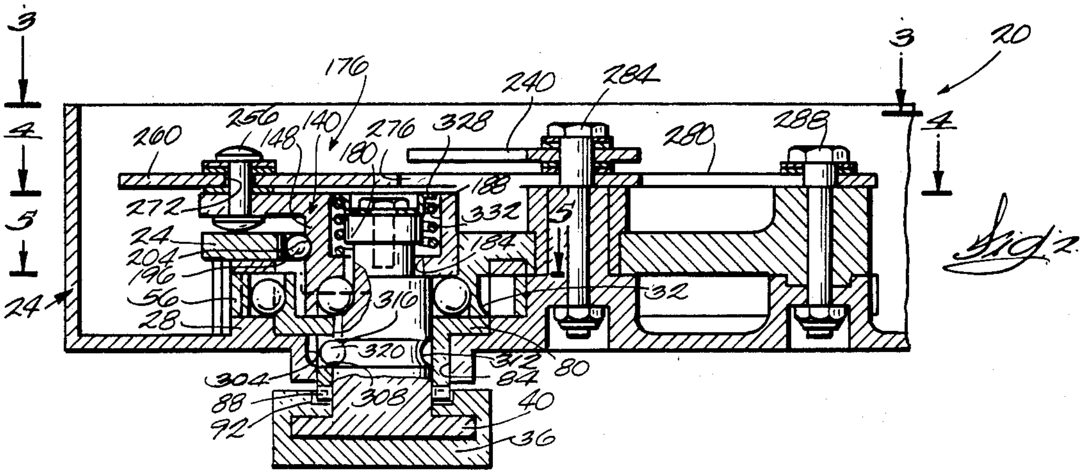
FIG. 2 is a cross-sectional view taken generally along the line 2—2 in FIG. 1, illustrating the location of various components when the control member is in the netural position and in a connected position for coordinated operation of the engine throttle and clutch.

Before explaining at least one embodiment of the invention in detail, it is to be understood that the invention is not limited in its application to the details of the construction and the arrangements of the components set forth in the following description or illustrated in the drawings. The invention is capable of other embodiments and of being practiced and carried out in various ways. Also, it is to be understood that the phraseology and terminology employed herein is for the purposes of description and should not be regarded as limiting.

DESCRIPTION OF PREFERRED EMBODIMENTS

Figure 1:
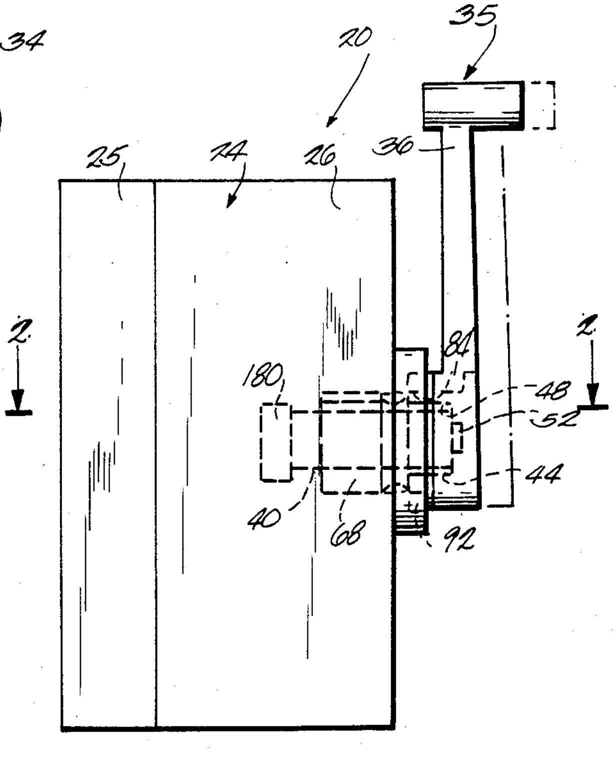
FIG. 1 is a perspective view of a portion of a single lever control which is particularly adapted for use with a marine propulsion device and which embodies various of the features of the invention.

Illustrated in the drawings is a single lever control 20 for operating the clutch and throttle of a remotely located internal combustion engine in a marine propulsion device (not shown) such as an outboard motor or a stern drive unit. Referring to FIG. 1, the single lever control 20 includes a housing 24 comprised of opposed cover halves or sections 25 and 26 which include respective side walls and which are suitably fastened together to form the generally closed housing 24.

As illustrated in FIGS. 2, 5 and 6 through 8, the housing 24 also includes a first cylindrical housing portion or boss 28 extending inwardly from the wall of the housing section 26, and a second cylindrical housing portion or boss 32 concentric with and within the first housing portion 28. The first housing portion 28 has an inner surface with a recess 34, and the second housing portion 32 has an inner surface with a recess 38.

As illustrated in FIG. 1, the single lever control 20 includes a control member 35 comprising a main control lever 36 mounted exteriorly of the housing 24 and a shaft member 40 having one end supported by the housing 24 for both pivotal or rotational movement and lateral or axial movement relative to the housing 24. The shaft member 40 is also suitably connected to the lower end of the main control lever 36 for both common rotation and common lateral or axial movement therewith. In other embodiments, means such as a knob (not shown) on the side of the control lever 36 can be used to assist in axial movement of the control lever 36 and shaft member 40. In the specific construction illustrated in FIG. 1, the outer end 44 of the shaft member 40 is provided with external spleens which are received in an internally spleened recess 48 provided in the lower end of the control lever 36, and the control lever 36 is fastened to the shaft member 40 by a bolt 52 threaded into the shaft member outer end 44.

Figures 6, 7, 8:
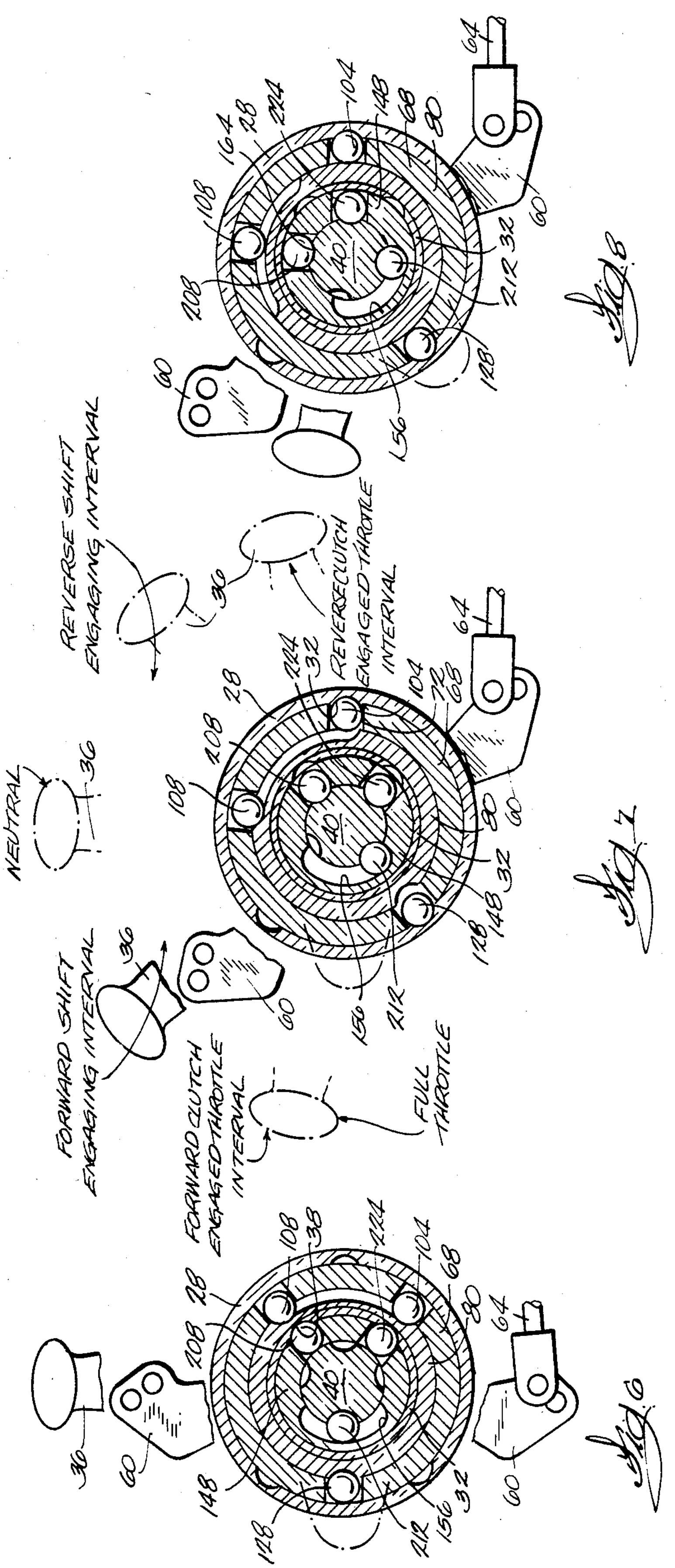
FIGS. 6 through 8 respectively, are views similar to FIG. 5 and illustrating the location of various of the components when the control member is in the neutral position, between the clutch engaging interval and the clutch engaged throttle interval, and in the full throttle position, respectively.

While other constructions can be used in other embodiments, the shaft member 40 and control lever 36 are axially movable relative to the housing 24 between first and second positions, as partially illustrated in ghost in FIG. 1, and the control lever 36 and shaft member 40 are mounted for common rotation from a neutral position to a full throttle position, as illustrated in FIG. 7. In moving between the neutral position and the full throttle position, the control lever 36 and shaft member 40 pass first through a clutch engaging interval and then through a clutch engaged interval. Even more particularly, the control lever 36 and the shaft member 40 are movable in a forward direction from the neutral position through a forward shift engaging interval and then a forward clutch engaged throttle advancing interval, and in a reverse direction from the neutral position through a reverse shift engaging interval and then a reverse clutch engaged throttle advancing interval.

When the shaft member 40 and control lever 36 are in the first position, as more fully explained hereinafter, movement of the control lever 36 from the neutral position provides for clutch engagement and then throttle advancement. When the shaft member 40 and control lever 36 are in the second position, as more fully explained hereinafter, movement of the control lever 36 from the neutral position provides for immediate throttle advancement with the engine clutch disengaged. It is, therefore, not necessary to first rotate the control lever 36 through the clutch engaging interval in order to accomplish engine warm up.

As illustrated in FIGS. 2 through 8, the control 20 also includes means for selectively operating the engine clutch in response to rotation of the control lever 36 when the shaft member 40 is in the first position. More particularly, the single lever control 20 includes a clutch shift member 56 which is supported within the housing 24 for coaxial rotation with the shaft member 40 between a neutral position and an engaged position. More specifically, the clutch shit member 56 is rotatable in a forward direction through the forward shift engaging interval and rotatably in a reverse direction through the reverse shift engaging interval.

Figure 5:
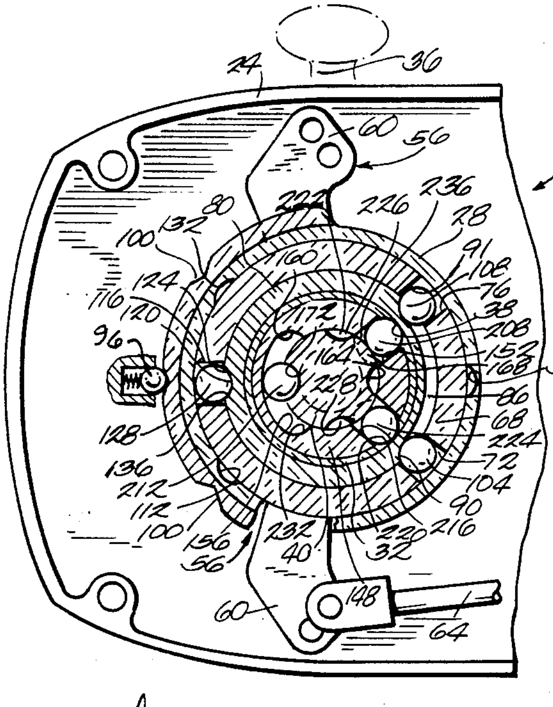
FIG. 5 is a sectional view taken generally along line 5—5 in FIG. 2, illustrating the location of various of the components while the control member is in the neutral position.

As illustrated in FIG. 5, the clutch shift member 56 is in the form of a plate including two radially extending arm portions or ends 60, each of which is adapted to be connected to, but only one is connected to, a push/pull cable 64 provided for connection to the engine clutch. Rotation of the clutch shift member 56 is, therefore, effective to actuate the engine clutch.

While other constructions can be used in other embodiments, the shift member 56 also includes a cylindrical shift cam 68, a portion of which is rotatably received in and concentric with the first housing portion 28. The shift cam 68 includes a first slot 72 aligned with the first housing portion recess 34 when the shaft member 40 is between the clutch engaging interval and the clutch engaged throttle interval (see FIG. 7), and a second slot 76 spaced from the first slot 72.

As illustrated in FIGS. 1, 2, and 5 through 8, the single lever control 20 also includes clutch drive means for providing engagement of the engine clutch in response to rotation of the control lever 36 through the clutch engaging interval. While other constructions can be used in other embodiments, the clutch drive means includes a cylindrical drive cam 80 which is rotatably received in and concentric with the shift cam 68, and which extends exteriorly of the housing 24 through an opening 84 provided therein. The drive cam has an outer surface with a dwell recess 86 forming a first abutment 90 and a spaced second abutment 91. The portion of the drive cam 80 located in the housing opening 84 is coaxial with the shaft member 40.

The clutch drive means also includes means operable between the control lever 36 and the drive cam 80 for providing common rotation of the control lever 36 and the drive cam 80 when the shaft member 40 and control lever 36 are in the first position and for permitting rotation of the control lever 36 relative to the drive cam 80 when the shaft member 40 and control lever 36 are in the second position. More particularly, as illustrated in FIGS. 1 and 2, such means comprises an abutment 88 in the form of a spline on the drive cam 80, and a mating indentation in the form of an internally splined recess 92 in the control lever 36 which receives the drive cam abutment 88 when the control lever 36 and the shaft member 40 are in the first position, and which is free of receipt of the drive cam abutment 88 when the control lever 36 and the shaft member 40 are in the second position. When the control lever 36 and the shaft member 40 are in the second position, the control lever 36 is spaced from the housing 20 and the drive cam abutment 88 and is free to rotate relative to the drive cam abutment 88.

As illustrated in FIGS. 5 through 8, the clutch drive means further includes shift driving means operable between the drive cam 80 and the shift cam 68 for rotating the shift cam 68 when the control lever 36 is in the first position and rotates through the clutch engaging interval, shift detent means for releasably holding the shift cam 68 when the control lever 36 is between the clutch engaging interval and the clutch engaged interval, shift locking means operable between the first housing portion 28 and the shift cam 68 for locking the shift cam 68 against movement relative to the housing 24 when the drive cam 80 rotates with the control lever 36 through the clutch engaged throttle interval, and shift dwell means operable between the drive cam 80 and the shift cam 68 for permitting rotation of the drive cam 80 relative to the shift cam 68 when the drive cam 80 and the control lever 36 rotate through the clutch engaged throttle interval.

As illustrated in FIG. 5, the shift detent means for releasably holding the shift cam 68 when the control lever 36 is between the clutch engaging interval and the clutch engaged throttle interval comprises a biased rounded member or ball 96 releasably receivable in three indentations or recesses 100 in the outer surface of the shift cam 68. The three indentations 100 are speced so that the ball 96 is received in one of the indentations 100 when the shift member 56 is in the neutral position, the forward engaged position, and the reverse engaged position.

While other constructions can be used in other embodiments, the shift locking means (see FIGS. 5 through 8) comprises a first outer roller 104 releasably receivable in the first housing portion recess 34, received in the shift cam first slot 72, and releasably received in the drive cam dwell recess 86 so that the first abutment 90 engages and releasably holds the first outer roller 104 in the first housing portion recess 34 (see FIG. 8) only when the drive cam 80 rotates with the control lever 36 through the clutch engaged throttle interval. When the drive cam 80 rotates with the control lever 36 through the clutch engaging interval (see FIG. 6), the first outer roller 104 is free of receipt in the first housing portion recess 34 and received in the drive cam dwell recess 86 so that the first drive cam abutment 90 engages the first outer roller 104 and the shift cam 68 rotates with the drive cam 80 through the clutch engaging interval.

The shift detent means prevents the drive cam 80, the shift cam 68 and the first outer roller 104 from passing by the first housing portion recess when the drive cam 80 and the control lever 36 in the first position are between the clutch engaging interval and the clutch engaged throttle interval.

The shift driving means and shift dwell means include a second outer roller 108 received in the shift cam second slot 76 and received in the drive cam dwell recess 86 so that the second outer roller 108 is free of movable engagement by the drive cam 80 (see FIG. 8) when the drive cam 80 rotates with the control lever 36 through the clutch engaged throttle interval in a clutch engaging direction and then back in a clutch disengaging direction, and so that the second drive cam abutment 91 engages the second outer roller 108 when the drive cam 80 rotates with the control lever 36 back through the clutch engaging interval in the clutch disengaging direction.

In order to provide additional shift locking protection, the first housing portion 28 includes a second recess 112 spaced from the first recess 34, the shift cam 68 includes a third slot 116 spaced from the second slot 76 and from the first slot 72, and the drive cam 80 includes a second recess 120 including an abutment 124. The drive cam second recess 120 and the shift cam third slot 116 are aligned with the first housing portion second recess 112 (see FIG. 7) when the control lever 36 and shift cam 68 are between the clutch engaging interval and the clutch engaged throttle interval. A third outer roller 128 is releasably received in the first housing portion second recess 112, received in the shift cam third slot 116, and releasably received in the second drive cam second recess 120 so that the second recess abutment 124 engages and releasably holds the third outer roller 128 when the drive cam 80 rotates with the control lever 36 through only the clutch engaged throttle interval, and so that the third outer roller 128 is free of receipt in the first housing portion second recess 112 and received in the drive cam second recess 120 when the drive cam 80 rotates with the control lever 36 through the clutch engaging interval.

A third recess 132 is also provided in the first housing portion 28 and spaced from the first housing portion recess 34. In addition, the drive cam second recess 120 includes a second abutment 136 so as to provide for operation of the additional shift locking means in a manner identical to the first housing portion first recess 34 and drive cam second abutment 91 when the drive cam 80 is rotated in the reverse shift direction.

Figure 4:
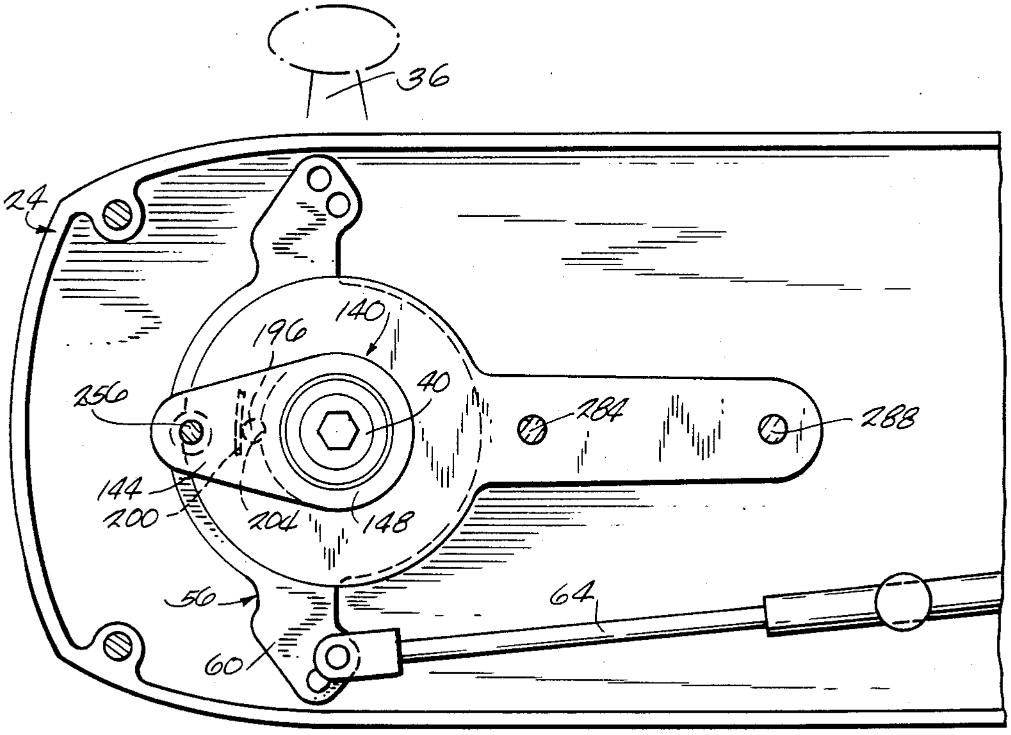
FIG. 4 is a sectional view taken generally along line 4—4 in FIG. 2, illustrating the location of various of the components while the control member is in the neutral position.

The control 20 also includes means for selectively operating the engine throttle in response to rotation of the control lever 36 when the shaft member 40 is in the first and the second positions. More particularly, as illustrated in FIG. 4, the single lever control 20 also includes a throttle drive member 140 supported within the housing 24 for rotation coaxially with the shaft member 40.

More particularly, the throttle drive member 140 is in the form of a plate including a radially extending arm portion 144 and a cylindrical throttle cam 148. As illustrated in FIGS. 2, and 5 through 8, the throttle cam 148 is concentric with and rotatably supported within the second housing portion 32, and the shaft member 40 is rotatably received in and is concentric with the throttle cam 148. The throttle cam 148 includes a slot 152 aligned with the second housing portion recess 38 when the shaft member 40 is between the clutch engaging interval and the clutch engaged throttle interval (see FIG. 7), and a dwell recess 156 forming an abutment 160. The shaft member 40 has an outer surface including a first recess 164 aligned with the throttle cam slot 152 when the shaft member 40 is between the clutch engaging interval and the clutch engaged throttle interval. The shaft member first recess 164 forms an abutment 168, and the shaft member 40 also includes a second recess 172 spaced from the first recess 164.

As illustrated in FIG. 2, the means for selectively operating the engine throttle includes first throttle drive means 176 for providing substantial advancement of the engine throttle in response to rotation of the control lever 36 through the clutch engaging interval when the shaft member 40 is in the second position. More particularly, the first throttle drive means 176 is operable between the throttle drive member 140 and the shaft member 40 for providing common rotation of the throttle drive member 140 and the shaft member 40 in response to rotation of the shaft member 40 through the clutch engaging interval when the shaft member 40 is in the second position. The first throttle drive means 176 also permits for rotation of the shaft member 40 relative to the throttle drive member 140, in response to rotation of the main control lever 36, when the shaft member 40 is in the first position.

The first throttle drive means 176 is engageable to provide common rotation of the throttle drive member 140 and the shaft member 40, and is disengageable to permit rotation of the shaft member 40 relative to the throttle drive member 140. More particularly, as illustrated in FIG. 2, the first throttle drive means 176 comprises an abutment 180 in the form of a rectangular end of the shaft member 40, and a mating rectangular recess or indentation 184 in the throttle drive member 140 which receives the shaft member end 180 when the shaft member 40 is in the second position, and which is free of receipt of the shaft member end 180 when the shaft member 40 is in the first position. As illustrated in FIG. 2, the throttle drive member 140 further includes a larger recess 188 adjacent the mating indentation 184 for providing free rotation of the shaft member end 180 relative to the throttle drive member 140 when the shaft member 40 is in the first position.

As illustrated in FIGS. 5 through 8, the single lever control 20 further includes second throttle drive means 192 selectively operable for providing substantial advancement of the engine throttle in resposne to rotation of the control lever 36 through the clutch engaged throttle interval when the shaft member 40 is in the first position. More particularly, the second throttle drive means 192 is operable between the shaft member 40 and the throttle cam 148 for providing common rotation of the shaft member 40 and the throttle drive member 140 in response to rotation of the control lever 36 through only the clutch engaged throttle interval when the shaft member 40 is in the first position. The second throttle drive means 192 also permits rotation of the shaft member 40 relative to the throttle drive member 140, in response to rotation of the main control lever 36, when the shaft member 40 is in the second position.

The second throttle drive means 192 comprises throttle driving means operable between the shaft member 40 and the throttle cam 148 for rotating the throttle cam 148 when the shaft member 40 rotates through the clutch engaged throttle interval, throttle detent means for releasably holding the throttle cam 148 when the shaft member 40 is between the clutch engaging interval and the clutch engaged throttle interval, throttle locking means operable between the throttle cam 148 and the second housing portion 32 for locking the throttle cam 148 against movement relative to the housing 20 when the shaft member 40 rotates with the control lever 36 through the clutch engaging interval when the shaft member 40 is in the first position, and throttle dwell means operable between the throttle cam 148 and the shaft member 40 for permitting rotation of the shaft member 40 relative to the throttle cam 148 when the shaft member 40 and the control lever 36 rotate through the clutch engaging interval.

More particularly, as illustrated in FIGS. 2 and 4, the throttle detent means comprises a ball 196 located in a recess in the control housing 24, and a detent leaf spring 200 biasing the ball 196 towards a recess 204 in the outer surface of the throttle cam 148. More particularly, the recess 204 is located on the throttle cam 148 so the detent ball 196 is aligned with the recess 204 in the throttle cam 148 when the throttle cam 148 and the shaft member 40 are in the neutral position. Since the throttle cam 148 does not move with the shaft member 40 through the clutch engaging interval because of the throttle dwell means, the detent ball 196 also releasably holds the throttle cam 148 when the throttle cam 148 and the shaft member 40 are between the clutch engaging interval and the clutch engaged throttle interval.

As illustrated in FIGS. 5 through 8, the throttle locking means comprises a first inner roller 208 releasably receivable in the second housing portion recess 38 (see FIG. 6), received in the throttle cam first slot 152, and releasably receivable in the shaft member first recess 164 (see FIG. 8) so that the shaft member abutment 168 engages and releasably holds the first inner roller 208 in the second housing portion recess 38 (see FIG. 5) when the shaft member 40 rotates through the clutch engaging interval in a clutch engaging direction and a clutch disengaging direction. When the shaft member 40 rotates through the clutch engaged throttle interval, the first inner roller 208 is received in the shaft member first recess 164 (see FIG. 8) so that the throttle cam 148 can rotate relative to the second housing portion 32.

The throttle detent means prevents the throttle cam 148 and first inner roller 208 from passing by the second housing portion recess 38 when the shaft member 40 and the throttle cam 148 are between the clutch engaging interval and the clutch engaged throttle interval.

The throttle driving means and throttle dwell means include a second inner roller 212 received in the shaft member second recess 172 and slidably received in the throttle cam dwell recess 156 so that the throttle cam abutment 160 engages the second inner roller 212 (see FIG. 7) when the shaft member 40 rotates through the clutch engaged throttle interval after rotating through the clutch engaging interval, and so that the second inner roller 212 is not movably engaged by the throttle cam 148 (see Fig. 6) when the shaft member 40 rotates through the clutch engaging interval in the clutch disengaging direction and the clutch engaging direction.

Likewise, for operation of the second throttle drive means 192 in the reverse shift direction, the shaft member 40 includes a third recess 222 spaced from the shaft member first recess 164 in the forward clutch engaging direction and forming a second abutment 226. Similarly, the throttle cam dwell recess 156 also extends in the reverse direction and includes a third abutment 232.

Additional throttle locking means, identical in operation to the shaft member first recess 164, the throttle cam first slot 152, the first inner roller 208, and the second housing portion first recess 38 is also provided in the form of a second throttle cam slot 216 aligned with a second housing portion second recess 220 (see FIG. 7) when the shaft member 40 is between the clutch engaging interval and the clutch engaged throttle interval, and a third inner roller 224 slidably received in the throttle cam second slot 216. Likewise, the outer surface of the shaft member 40 includes a fourth recess 228 aligned with the throttle cam second slot 216 (see FIG. 7) when the shaft member 40 is between the forward shift engaging interval and the forward shift engaged throttle interval.

The second throttle drive means 192 further includes means operable between the shaft member 40 and the second housing portion 32 for permitting rotation of the throttle cam 148 relative to the second housing portion 32 when the shaft member 40 is in the second position, and for preventing axial movement of the shaft member 40 from the second position to the first position when the shaft member is not in the neutral position. Such means comprises the outer surface of the shaft member 40 having recesses 236, each of which is aligned with one of the second housing portion first recess 38 and the second housing second recess 220 when the shaft member 40 is in the neutral position in order to receive one of the first and third inner rollers 208 and 224, respectively, when the shaft member 40 is in the second position. Accordingly, when the shaft member 40 is in the second position, the first and third inner rollers 208 and 224, respectively, are free of receipt in the second housing portion first and second recesses 38 and 220, respectively, so that the shaft member 40 can rotate relative to the throttle cam 148.

When the shaft member 40 is in the second position and not in the neutral position, the first inner roller 208 and third inner roller 224 are not aligned with the housing recesses 38 and 220, respectively, so the shaft member 40 can not move from the second position to the first position.

Figure 3:
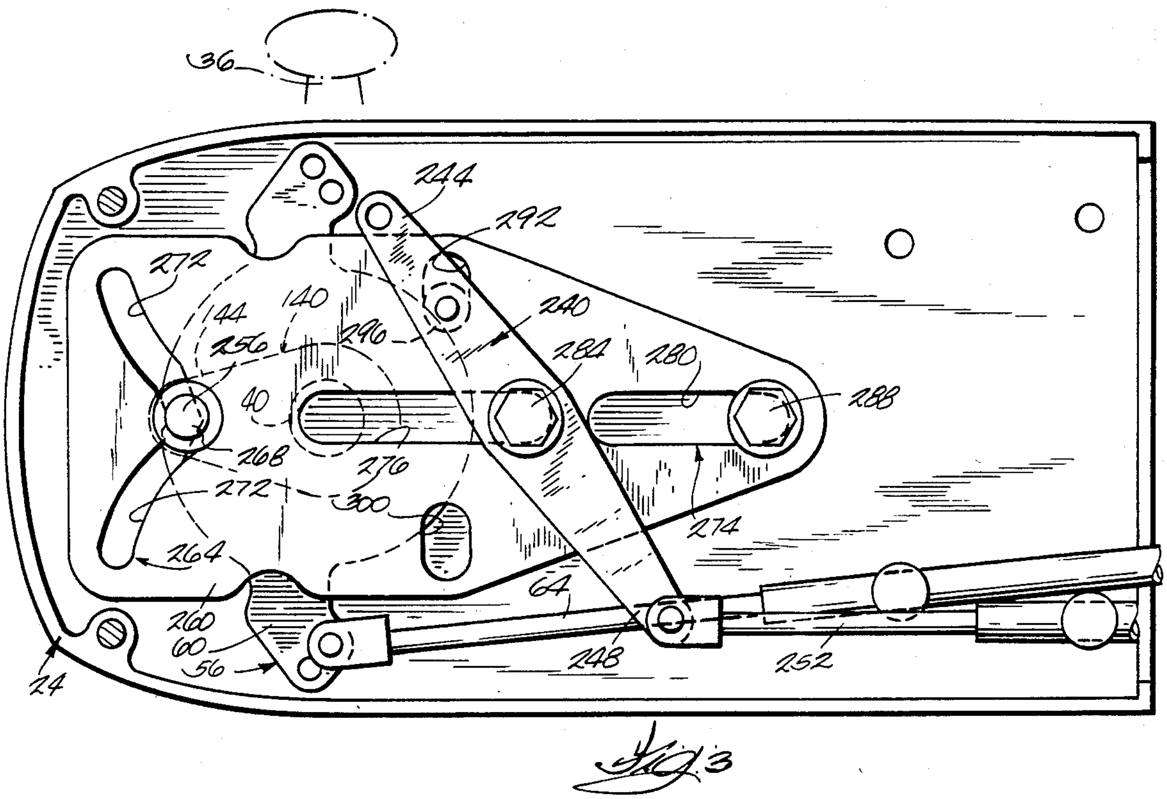
FIG. 3 is a sectional view taken generally along line 3—3 in FIG. 2, illustrating the location of various of the components while the control member is in the neutral position.

As illustrated in FIG. 3, the means for providing engine throttle operation in response to rotation of the control lever 36 further includes a throttle lever 240 supported within the control housing 24 for pivotal movement. The throttle lever 240 is adapted to actuate the engine throttle in response to movement of the throttle lever 240. More particularly, the throttle lever 240 is pivotally attached intermediate the ends 244 and 248, respectively, thereof to the housing 24. The upper and lower ends 244 and 248, respectively, of the throttle lever 240 are each adapted to be connected to, but only one is connected to, a push/pull cable 252 attached to the engine throttle. Rotation or pivotal movement of the throttle lever 240 in a counter clockwise direction, as viewed in FIG. 3, results in translation of the lower end 248 of the throttle lever 240 which serves to actuate or substantially advance the engine throttle.

As illustrated in FIG. 3, the means for operating the engine throttle also includes means operable between the throttle lever 240 and the throttle drive member 140 to rotate the throttle lever 240 in response to rotation of the throttle drive member 140. The throttle rotating means includes a drive roller or pin 256 connected to the throttle drive member 140. The drive pin 256 extends from near the outer end of the arm portion 144 of the throttle drive member 140. The throttle lever rotating means also comprises a cam member 260 having a cam track 264 receiving the drive pin 256 and having a shape effective to displace the cam member 260 relative to the shaft member 40 to move the throttle lever 240 in response to rotation of the throttle drige member 140.

More particularly, the cam member 260 is in the form of a plate and the cam track 264 includes a central portion 268 and oppositely extending end portions 272, which project in a direction away from the central portion 268 at distances which increase from the rotational axis or center of the shaft member 40 with increasing distance from the central portion 268.

The throttle lever rotating means further includes guide means operable between the cam member 260 and the housing 24 for guiding displacement of the cam member 260 relative to the shaft member 40 along a rectilinear path in response to movement of the drive pin 256 in the cam track 264. More particularly, the guide means includes guide track means 274 comprising linear spaced first and second guide track openings 276 and 280, respectively, in the cam member 260. The guide tracks openings 276 and 280, respectively, extend in the general direction of the desired translation of the lower throttle lever end 248.

The guide means also includes a first guide pin 284 which rotatably connects the throttle lever 240 to the housing 24, and which is received in the first guide track opening 276. The guide means also includes a second guide pin 288 connected to the housing 24, spaced from the first guide pin 284, and received in the second guide track opening 280.

The throttle lever rotation means further includes a displacement track 292 adjacent the throttle lever 240 and extending generally perpendicular to the guide track means 274, and a throttle projection or roller 296 rotatably mounted on the throttle lever 240, received in the perpendicularly extending displacement track 292, and spaced from the first guide pin 284 so that movement of the cam member 260 relative to the first guide pin 284 moves the throttle roller 296 and rotates the throttle lever 240 so that the lower end 248 of the throttle lever 240 thereby moves the push/pull cable 252 and advances the engine throttle. More particularly, the throttle roller 296 is located between the upper end 244 of the throttle lever 240 and the first guide pin 284.

A second perpendicular displacement track 300 in the cam member 260 on the opposite side of the guide track means 274 is provided to permit operation of the single lever control 20 when rotated 180 degrees, as more fully described hereinafter.

As illustrated in FIG. 2, the single lever control 20 also includes lock-out means for preventing operation of the clutch drive means when the first throttle drive means 176 is operable to provide substantial advancement of the engine throttle. More particularly, while other constructions can be employed in other embodiments, the lock-out means is operable between the housing 24, the drive cam 80 and the shaft member 40 for preventing rotation of the drive cam 80 relative to the housing 24 when the shaft member 40 is in the first position. The lock-out means also permits rotation of the drive cam 80 relative to the housing 24 when the shaft member 40 is in the first position.

More particularly, as illustrated in FIG. 2, the control housing 24 includes a recess 304 adjacent the drive cam 80, and the drive cam 80 includes a slot 308 aligned with the control housing recess 304 when the drive cam 80 and the shaft member 40 are in the neutral position. The shaft member 40 includes an annular groove which provides an opening 312 aligned with the drive cam slot 308 when the shaft member 40 is in the first position. The annular groove 312 also forms a shaft member abutment 316.

More particularly, the lock-out means comprises a roller 320 received in the drive cam slot 308 and releasably receivable in the opening 312 when the shaft member 40 is in the first position and in the neutral position, and releasably receivable in the control housing recess 304 when the shaft member 40 is in the second position. Movement of the shaft member 40 from the first position to the second position causes the shaft member abutment 316 to engage and releasably hold the roller 320 in the control housing recess 304 to thereby lock the drive cam 80 in place and prevent rotation of the drive cam 80 and clutch shift member 56 relative to the housing 24 when the shaft member 40 is in the second position.

The lock-out means is also operable between the shaft member 40 and the housing 24 for preventing axial movement of the shaft member 40 relative to the housing 24 when the shaft member 40 is in the first position and is not in the neutral position. More particularly, when the drive cam 80 and the shaft member 40 are not in the neutral position, the lock-out roller 320 is not aligned with the control housing recess 304, and the lock-out roller 320 can not leave the opening 312, thus preventing axial movement of the shaft member 40 from the first position to the second position.

As illustrated in FIG. 2, the single lever control 20 also includes means for returning the shaft member 40 from the second position to the first position when the control lever 36 is in the neutral position. More particularly, the shaft member rectangular end portion 180 located in the larger recess 188 in the drive cam 80 includes a radially outwardly extending flange 328. Located between the flange 328 and a wall of the drive cam forming the larger recess 188 is biasing means in the form of a compression spring 332 concentric with the shaft member 40. The spring 332 is compressed as the shaft member 40 is moved from the first position to the second position. As a result, when the shaft member 40 and control lever 36 return to the neutral position after engine warm up, the shaft member 40 is assisted in returning to the first position by the compressed spring 332.

Accordingly, as generally illustrated in FIG. 2, when the lever 36 and shaft member 40 are in the second position, the drive cam abutment 88 is free of receipt in the control lever spined recess 92, the spring 332 is depressed, and the square shaft member end 180 is engagable with the throttle drive member 140. Movement of the control lever 36 thus rotates the throttle drive member 140, actuating the drive pin 256, translating the cam member 260, and advancing the throttle lever 240 for instant throttle warm-up.

Figure 11:
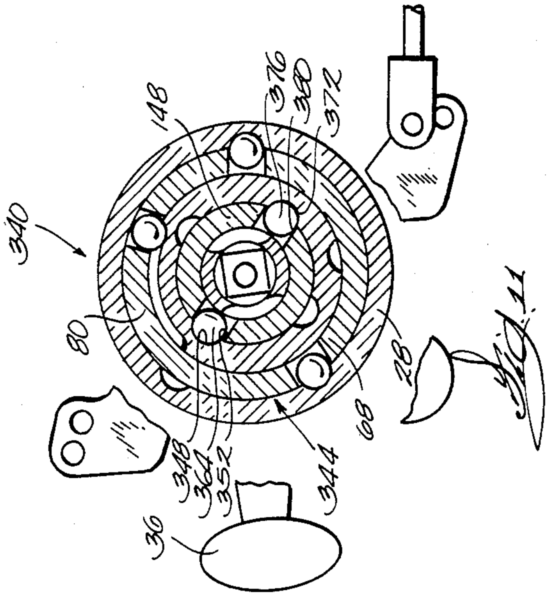
FIGS. 9 through 11 are views similar to FIGS. 6 through 8 only of an alternate embodiment of a single lever control which embodies various of the features of the invention.
Figure 10:
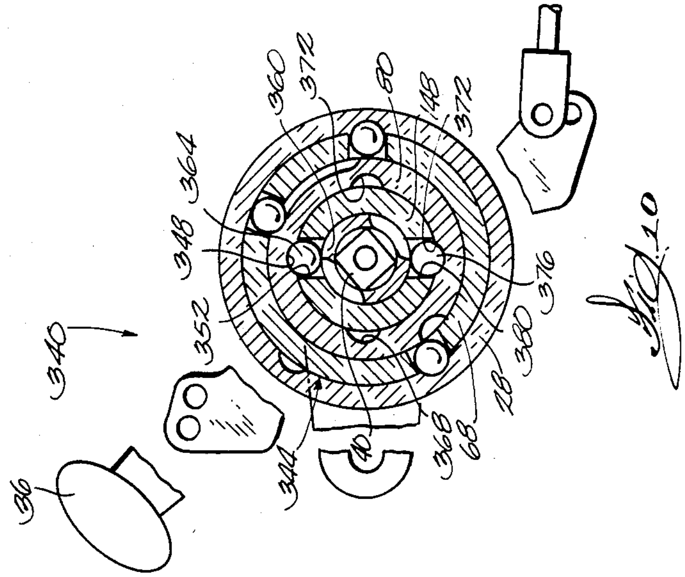
Figure 9:
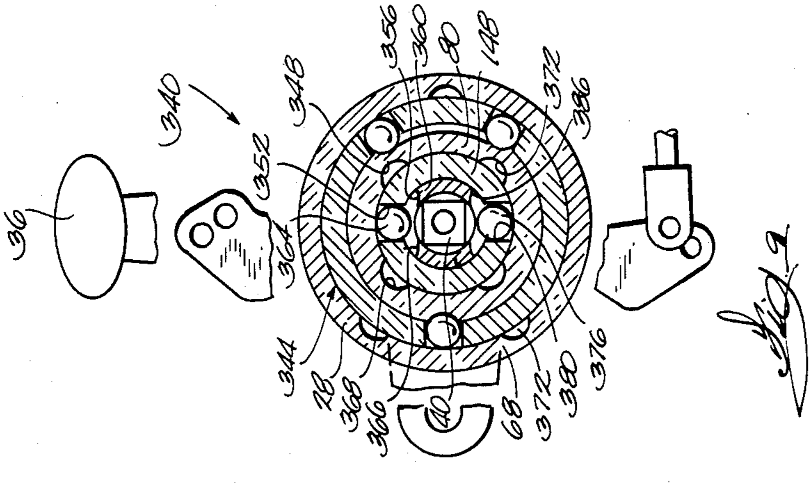

An alternate single lever control embodiment 240 including an alternate second throttle drive means 344 is shown in FIGS. 9 through 11. In the single lever control 340 illustrated, various components identical to the forementioned construction are shown with similar numerical designations. This embodiment includes the throttle detent means, but does not illustrate throttle locking means.

The single lever control 340 includes a first cylindrical housing portion 28 and omits the second cylindrical housing portion 32. The shift cam 68 is concentric with and within the first housing portion 28 and the drive cam 80 is still concentric with and within the shift cam 68. Means operable between the control lever 36 and the drive cam 80 to provide common rotation thereof is also present in this embodiment. In this embodiment 340, however, the throttle cam 148 is concentric with and within the drive cam 80. And, the shaft member 40 is still concentric with the drive cam 80.

More particularly, as illustrated in FIG. 9, the drive cam 80 includes an inner surface with a recess 348 and the throttle cam 148 includes a slot 352 aligned with the drive cam recess 348 (see FIG. 10) when the shaft member 40 is between the clutch engaging interval and the clutch engaged throttle interval. The shaft member 40 includes an outer surface with a dwell recess 356 forming an abutment 360 and the throttle driving means and the throttle dwell means comprise an inner roller 364 received in the throttle cam slot 352 and releasably receivable in the dwell recess 356. The inner roller 364 is also releasably receivable in the drive cam recess 348 so that the shaft member abutment 360 engages and releasably holds the inner roller 364 in the drive cam recess 348 (see FIG. 10) when the shaft member 40 and the drive cam 80 rotate through the clutch engaged throttle interval, and so that the inner roller 364 is received in the shaft member dwell recess 356 (see FIG. 9) and is free of movable engagement by the shaft member 40 when the shaft member 40 rotates through the clutch engaging interval. A second recess 368 is provided in the inner surface of the drive cam 80 and the dwell recess 356 forms a second abutment 366 for similar operation in the reverse clutch engaging direction.

While other constructions can be employed in other embodiments, the throttle driving means and throttle dwell means also includes an identical arrangement of drive cam recesses 372, inner roller 376, throttle cam slot 380 and shaft member dwell recess 384 opposite the above described elements for providing added positive engagement between the coacting throttle cam 148, drive cam 80 and shaft member 40.

It should now be appreciated from the description of the invention that the single lever control 20 illustrated can be mounted on either the port or starboard side of a boat. To reverse the mounting from use on one side of the boat to the other, the control lever 36 and housing 240 are rotated 180 degrees relative to the shaft member 40. The push/pull cable 64 for attachment to the engine clutch is moved from the one end of the clutch shift member 56 to the other end of the clutch shift member 56. The push/pull cable 252 provided for connection to the engine throttle is moved from the one end 244 of the throttle lever 240, to the other end 244 of the throttle lever 240, and the throttle roller 296 is moved from its attachment between the first guide pin 284 and the second end 244 of the throttle lever 240 to between the first guide pin 284 and the first end 248 of the throttle lever 240. The throttle roller 296 is then slidably received in the second perpendicular guide track 300.

Various of the features of the invention are set forth in the following claims.

I claim:

1. A single lever control for use with an engine including a clutch and a throttle, said control comprising a housing, a control member rotatably mounted on said housing for movement between a neutral position and a full throttle position through a clutch engaging interval and then a clutch engaged throttle advancing interval, clutch drive means adapted to be connected to the engine clutch and selectively operably connected to said control member for providing engagement of the engine clutch in response to rotation of said control member through said clutch engaging interval, and throttle drive means adapted to be connected to the engine throttle and selectively operably connected to said control member for providing substantial advancement of the engine throttle in response to rotation of said control member through the clutch engaging interval.

2. A single lever control in accordance with claim 1 and further including second throttle drive means adapted to be connected to the engine throttle and selectively operably connected to said control member for providing substantial advancement of the engine throttle in response to rotation of said control member through the clutch engaged throttle advancing interval.

3. A single lever control in accordance with claim 1 and further including means operable between said housing and said throttle drive means for preventing operation of said clutch drive means when said throttle drive means is operable to provide substantial advancement of the engine throttle.

4. A single lever control for use with an engine including a clutch and a throttle, said control comprising a housing, a control member supported by said housing for axial movement relative to said housing between first and second positions and for rotation relative to said housing from a neutral position to a full throttle position through a clutch engaging interval and then a clutch engaged throttle advancing interval, clutch drive means adapted to be connected to the engine clutch and selectively operably connected to said control member for engagement of the engine clutch in response to rotation of said control member through the clutch engaging interval, a throttle drive member movably supported within said housing and adapted to be operably connected to the engine throttle, first throttle drive means operable between said throttle drive member and said control member for providing common movement of said throttle drive member and said control member in response to rotation of said control member through said clutch engaging interval when said control member is in said second position, and for permitting rotation of said control member relative to said throttle drive member when said control member is in said first position, and second throttle drive means operable between said control member and said throttle drive member for providing common movement of said control member and said throttle drive member in response to rotation of said control member through said clutch engaged throttle advancing interval when said control member is in said first position, and for permitting rotation of said control member relative to said throttle drive member when said control member is in said second position.

5. A single lever control in accordance with claim 4 and further including means for axially biasing said control member from the second position to the first position when the control member is in the neutral position.

6. A single lever control for use with an engine including a throttle, said control comprising a housing, a throttle drive member supported within said housing and including a cylindrical throttle cam, a control member supported by said housing for rotation relative to said housing from a neutral position to a full throttle position through a first interval and then a second interval and rotatably received in and concentric with said throttle cam, throttle driving means operable between said control member and said throttle cam for rotating said throttle cam when said control member rotates through said second interval, and throttle dwell means operable between said throttle cam and said control member for permitting rotation of said control member relative to said throttle cam when said control member rotates through said first interval.

7. A single lever control for use with an engine including a clutch and a throttle, said control comprising a housing, a throttle drive member supported within said housing and including a cylindrical throttle cam, a control member supported by said housing for rotation relative to said housing from a neutral position to a full throttle position through a clutch engaging interval and then a clutch engaged throttle advancing interval, and rotatably received in and concentric with said throttle cam, clutch drive means adapted to be connected to the engine clutch and operably connected to said control member for providing engagement of the engine clutch in response to rotation of said control member through said clutch engaging interval, throttle driving means operable between said control member and said throttle cam for rotating said throttle cam when said control member rotates through said clutch engaged throttle advancing interval, and throttle dwell means operable between said throttle cam and said control member for permitting rotation of said control member relative to said throttle cam when said control member rotates through said clutch engaging interval.

8. A single lever control in accordance with claim 7 wherein said throttle cam has an inner surface, said control member has an outer surface, a dwell recess is in one of said throttle cam inner surface and said control member outer surface and forms an abutment, a second recess is in the other of said throttle cam inner surface and said control member outer surface, and wherein said throttle driving means and said throttle dwell means comprise a roller received in said second recess and slidably received in said dwell recess so that said abutment engages said roller when said control member rotates through said clutch engaged throttle advancing interval and so that said inner roller is free of movable engagement by said throttle cam when said control member rotates through said clutch engaging interval.

9. A single lever control in accordance with claim 7 and further including a cylindrical drive cam concentric with and rotatably receiving therein said throttle cam, said drive cam having an inner surface with a recess, and means operable between said control member and said drive cam to provide common rotation thereof, and wherein said throttle cam includes a slot aligned with said drive cam recess when said control member is between said clutch engaging interval and said clutch engaged throttle advancing interval, said control member has an outer surface with a dwell recess forming an abutment, and said throttle driving means and said throttle dwell means comprise a roller received in said throttle cam slot and releasably receivable in said dwell recess and releasably receivable in said drive cam recess so that said control member abutment engages and releasably holds said roller in said drive cam recess when said control member and said drive cam rotate through said clutch engaged throttle advancing interval, and so that said roller is received in said control member dwell recess and free of movable engagement by said control member and said drive cam when said control member rotates through said clutch engaging interval.

10. A single lever control for use with an engine including a clutch and a throttle, said control comprising a housing, a cylindrical portion fixed relative to said housing, a throttle drive member supported within said housing and including a cylindrical throttle cam concentric with and within said cylindrical portion, a control member supported within said housing for rotation relative to said housing from a neutral position to a full throttle position through a clutch engaging interval and then a clutch engaged throttle advancing interval and rotatably received in and concentric with said throttle cam, clutch drive means adapted to be connected to the engine clutch and operably connected to said control member for providing engagement of the engine clutch in response to rotation of said control member through said clutch engaging interval, and throttle drive means comprising throttle driving means operable between said control member and said throttle cam for rotating said throttle cam when said control member rotates through said clutch engaged throttle advancing interval, throttle detent means for releasably holding said throttle cam when said control member is between said clutch engaging interval and said clutch engaged throttle advancing interval, throttle locking means operable between said throttle cam and said cylindrical portion for locking said throttle cam against movement relative to said housing when said control member rotates through the clutch engaging interval, and throttle dwell means operable between said throttle cam and said control member for permitting rotation of said control member relative to said throttle cam when said control member rotates through said clutch engaging interval.

11. A single lever control in accordance with claim 10 wherein said control member is supported by said housing for axial movement relative to said housing between first and second positions, and wherein said throttle drive means is operable when said control member is in said first position, and wherein said throttle drive means further includes means which is operable between said control member and said cylindrical portion for permitting rotation of said throttle cam relative to said cylindrical portion when said control member is in said second position.

12. A single lever control in accordance with claim 10 wherein said cylindrical portion has an inner surface with a recess, wherein said throttle cam includes a slot aligned with said cylindrical portion recess when said control member is between said clutch engaging interval and said clutch engaged throttle advancing interval, and an inner surface with a dwell recess forming an abutment, wherein said control member has an outer surface including a first recess aligned with said throttle cam slot when said control member is between said clutch engaging interval and said clutch engaged throttle advancing interval and forming an abutment, and a second recess spaced from said first recess, and said throttle locking means comprises a first roller releasably receivable in said cylindrical portion recess, received in said throttle cam slot, and releasably receivable in said control member first recess so that said control member abutment engages and releasably holds said first roller in said cylindrical portion recess when said control member rotates through the clutch engaging interval, and so that said first roller is received in said control member first recess and free of receipt in said cylindrical portion recess when said control member rotates through the clutch engaged throttle advancing interval, and wherein said throttle driving means and said throttle dwell means comprises a second roler received in said second control member recess and slidably received in said dwell recess so that said throttle cam abutment engages said second roller when said control member rotates through said clutch engaged throttle advancing interval, and so that said second roller is free of movable engagement by said throttle cam when said control member rotates through said clutch engaging interval.

13. A single lever control in accordance with claim 12 wherein said control member is supported by said housing for axial movement relative to said housing between first and second positions, and wherein said throttle drive means is operable when said control member is in said first position, and wherein said throttle drive means further includes means which is operable between said control member and said cylindrical portion for permitting rotation of said throttle cam relative to said cylindrical portion when said control member is in said second position and which comprises said control member having a third recess receiving said first roller when said control member is in said second position so that said first roller is free of receipt in said cylindrical portion recess.

14. A single lever control for use with an engine including a throttle, said control comprising a housing, a throttle lever supported intermediate the ends thereof by said housing for pivotal movement above an axis fixed with respect to said housing and adapted to actuate the engine throttle in response to movement of said throttle lever, a throttle drive member movably supported by said housing, a cam member, means on said housing and on said cam member for supporting said cam member for movement relative to said housing along a predetermined rectilinear path, means operable between said throttle drive member and said cam member for displacing said cam member along said path in response to movement of said throttle drive member, and means operable between said cam member and said throttle lever to move said throttle lever in response to movement of said cam member along said path.

15. A single lever control for use with an engine including a throttle, said control comprising a housing, a throttle lever supported on said housing for movement and including an end adapted to actuate the engine throttle in response to movement of said throttle lever, a throttle drive member movably supported on said housing, a drive pin connected to said throttle drive member, and means operable between said throttle lever and said throttle drive member for moving said throttle lever in response to movement of said throttle drive member, said throttle lever moving means comprising a cam member with a cam track receiving said drive pin and having a shape effective to displace said cam member relative to said housing in response to rotation of said throttle drive member, and a displacement track adjacent said throttle lever, guide track means in said cam member and extending in the direction of displacement of said throttle lever end and generally perpendicular to said displacement track for guiding displacement of said cam member relative to said housing along a rectilinear path in response to movement of said drive pin in said cam track, a guide pin rotatably connecting said throttle lever to said housing and received in said guide track means, and a throttle projection on said throttle lever, received in said displacement track, and spaced from said guide pin so that movement of said cam member relative to said guide pin moves said throttle projection thereby moving said throttle lever.

16. A single lever control in accordance with claim 15 wherein said guide track means further includes a second guide pin connected to said housing, spaced from said first guide pin and received in said guide track means.

17. A single lever control for use with an engine including a throttle, said control comprising a housing, a cylindrical portion fixed relative to said housing and having an inner surface with a recess, a control member supported concentrically within said cylindrical portion for rotation relative to said housing from a neutral position to a full throttle position through a first interval and then a second interval, said control member having an outer surface including a recess aligned with said cylindrical portion recess when said control member is between said first interval and said second interval and forming an abutment, a throttle drive member supported witin said housing and including a cylindrical throttle cam concentric with and within said cylindrical portion, and rotatably receiving therein said control member, said throttle cam including a slot aligned with said cylindrical portion recess when said control member is between said first interval and said second interval, and throttle locking means comprising a roller releasably receivable in said cylindrical portion recess, received in said throttle cam slot, and releasably receivable in said control member recess so that said control member abutment engages and releasably holds said roller in said cylindrical portion recess when said control member rotates through the first interval, and so that said roller is received in said control member recess and free of receipt in said cylindrical portion recess when said control member rotates through the second interval.

18. A single lever control for use with an engine including a clutch and a throttle, said control comprising a housing, a cylindrical portion fixed relative to said housing and having an inner surface with a recess, a control member supported concentrically within said cylindrical portion for rotation relative to said housing from a neutral position to a full throttle position through a clutch engaging interval and then a clutch engaged throttle advancing interval, said control member having an outer surface including a recess aligned with said cylindrical portion recess when said control member is between said clutch engaging interval and said clutch engaged throttle advancing interval and forming an abutment, a throttle drive member supported within said housing and including a cylindrical throttle cam concentric with and within said cylindrical portion, and rotatably receiving therein said control member, said throttle cam including a slot aligned with said cylindrical portion recess when said control member is between said clutch engaging interval and said clutch engaged throttle advancing interval, clutch drive means adapted to be connected to the engine clutch and operably connected to said control lever for providing engagement of the engine clutch in response to rotation of said control member through said clutch engaging interval, and throttle locking means comprising a roller releasably receivable in said cylindrical portion recess, received in said throttle cam slot, and releasably receivable in said control member recess so that said control member abutment engages and releasably holds said roller in said cylindrical portion recess when said control member rotates through the clutch engaging interval and so that said roller is received in said control member recess and free of receipt in said cylindrical portion recess when said control member rotates through the clutch engaged throttle advancing interval.

19. A single lever control for use with an engine including a throttle, said control comprising a housing, a control member rotatably mounted on said housing, a throttle drive member movably supported by said housing and adapted to be operably connected to the engine throttle, first throttle drive means selectively operably connecting said control member and said throttle drive member for providing substantial advancement of the engine throttle in response to rotation of said control member, and said throttle drive means selectively operably connecting said control member and said throttle drive member for providing substantial advancement of the engine throttle in response to rotation of said control member.

20. A single lever control for use with an engine including a throttle, said control comprising a housing, a control member supported by said housing for rotation relative to said housing from a neutral position to a full throttle position, and for axial movement relative to said housing between first and second positions, a throttle drive member movably supported by said housing and adapted to be operably connected to the engine throttle, first throttle drive means operable between said throttle drive member and said control member for providing common movement of said throttle drive member and said control member in response to rotation of said control member when said control member is in said second position, and for permitting rotation of said control member relative to said throttle drive member when said control member is in said first position, and second throttle drive means operable between said control member and said throttle drive member for providing common movement of said control member and said throttle drive member in response to rotation of said control member when said control member is in said first position, and for permitting rotation of said control member relative to said throttle drive member when said control member is in said second position.

21. A single lever control in accordance with claim 20 and further including means for axially biasing said control member from the second position to the first position when said control member is in the neutral position.

* * * * *